No. 625,056. Patented May 16, 1899.
W. N. PARRISH.
WIRE WINDING DEVICE.
(Application filed Nov. 21, 1898.)
(No Model.)
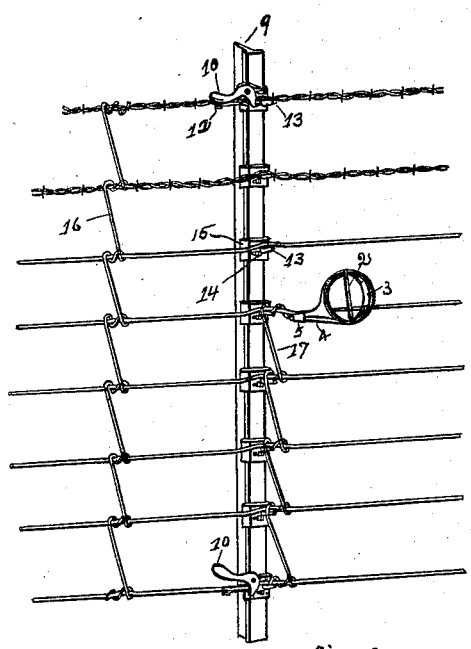
Witnesses;
Edgar F. Heath
Samuel Dickinson
William N. Parrish
Inventor;
Robert W. Randle
Attorney.

UNITED STATES PATENT OFFICE.

WILLIAM N. PARRISH, OF RICHMOND, INDIANA.

WIRE-WINDING DEVICE.

SPECIFICATION forming part of Letters Patent No. 625,056, dated May 16, 1899.

Application filed November 21, 1898. Serial No. 697,018. (No model.)

*To all whom it may concern:*

Be it known that I, WILLIAM N. PARRISH, a citizen of the United States, residing at Richmond, in the county of Wayne and State of Indiana, have invented certain new and useful Improvements in Fence-Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in fence-machines in which the labor and expense of securing the horizontal wires of a fence by means of perpendicular wires are reduced to a minimum; and the objects of my improvement are, first, to provide a fence-machine with which perpendicular wires or stays can be attached to the horizontal wires of a fence quickly and with very little labor; second, to provide a fence-machine with which perpendicular wires or stays can be attached to the horizontal wires of a fence with the least possible amount of material; third, to provide a fence-machine that is very simple in construction, with few parts, and these not liable to get out of order; fourth, to provide a new article of manufacture in a fence-machine that can be easily carried in the hand, being easily transported from place to place. I attain these objects by the mechanism illustrated in the accompanying drawings, in which—

Figure 1 is a view in perspective of my device for attaching the perpendicular wires. Fig. 2 is a sectional view of the above. Fig. 3 is a perspective view of my entire machine, showing all of my machine and a section of fence, showing the machine in operation, and also a completed part of the fence as made by my machine. Fig. 4 is the same as Fig. 1 except that a spool of wire is secured to the device. Fig. 5 is a detail view of the top or bottom end of spacer or finger-post, showing the manner of securing the post to the fence to be operated on.

Similar figures refer to similar parts throughout the several views.

The main part of my invention is shown in Fig. 1. All other parts shown and described are auxiliary to this.

The main part referred to is preferably made in one piece of casting, with the exception of the nozzle 5, which should be made of steel and screwed into the shank 4, thus virtually forming one piece, as shown in Fig. 1. The wire to be used in forming the perpendicular stays can be prepared in two ways—first, by winding the wire on a spool 7 and inserting the spool in the device, as shown in Fig. 4, and securing same in place by a bolt 8 passing through the center of the cross-piece or guard 2 and through the center of the spool 7 and securing same by a nut; but I prefer and think the better way is to have the wire cut in lengths just sufficient in each to form a complete stay, as shown at 16, and to have each length wound into a coil, with the outer end projecting about eight inches. These coils should be of a size to readily be placed in the device, Fig. 1. This is quickly done by holding the device in the left hand with the nozzle 5 pointing to the left or slightly forward and with the guards 2 and 3 uppermost. The coil of wire previously prepared is taken in the right hand and the projecting end referred to is passed under the guard 2 and into the hole 6 from the rear. The body of the coil is brought under the guard 2 and on the outside of the guard 3, as shown in Fig. 3. When the device is threaded under either plan proposed, the wire extends from the nozzle 5 through the opening 6 about two inches, as shown in Fig. 4. In order to attach the stay with my device, it is necessary to have something to hold each wire as the stay is attached. This I accomplish by means of a T-bar 9, Fig. 3, said bar to be preferably about the length of the height of the fence. To this bar is secured fingers 13, which consist of three parts—viz., the finger proper, 13, the clamp or finger plate 15, which fits over the head of the bar 9, and the set-screw 14. The fingers are placed on the bar 9 from either end of the bar and are brought to the point desired and secured by turning the set-screw 14 to the right.

The extreme upper and lower finger-plates have an additional finger 12 and a lever or clamp 10 for securing the bar 9 to the top and bottom wires of the fence, as shown in Fig. 3.

As already intimated, my improvements are intended for securing the perpendicular stays 16 to a wire fence after the horizontal wires have been placed in position. I should state that a small hole slightly larger than the wire to be used should be in the bottom finger-plate, near the root of the finger proper, and is shown more clearly in Fig. 5 at 18.

My mode of operating my improvements is as follows: The fingers 13 are all placed in position on the T-rod 9 to correspond with the wire in the fence, as stated. The spacer-rod 9 is brought up to the wires, so that one wire of the fence lies across one of the fingers 13. The two levers 10 10 are then pressed down, which clamp onto the top and bottom wires of the fence and secure this part of the machine in place. It is now ready to attach a stay. The part shown in Fig. 1, which is now threaded, as previously stated, is brought into use. The wire projecting from the nozzle 5 is now inserted in the hole 18 and the wire is brought over the finger 13 and twice around the horizontal wire by simply using the device seen in Fig. 1 as a lever, the wire paying out as the work progresses. The wire is then brought over the next higher finger and around the corresponding wire, and so on to the top. The last turn of the device should use the last part of the wire in the device. The levers 10 10 are then thrown up and the bar 9 and all thereto secured are removed from the fence and the stay is left, as shown by 16. The bar 9 is then secured at another point and the same process repeated, as described.

What I claim, and desire to secure by Letters Patent, is—

In a fence-machine, a winding device comprising a circular body having guards, a hollow shank, and a hollow nozzle secured to said shank, substantially as described.

In testimony whereof I affix my signature in presence of two witnesses.

WILLIAM N. PARRISH.

Witnesses:
   EDGAR F. HIATT,
   SAMUEL DICKINSON.